US012388833B2

(12) United States Patent
Fang et al.

(10) Patent No.: US 12,388,833 B2
(45) Date of Patent: Aug. 12, 2025

(54) ATTRIBUTE-BASED ACCESS CONTROL USING SCOPED ROLES AND CONDITIONED PERMISSIONS DYNAMIC POLICIES

(71) Applicant: Dell Products L.P., Round Rock, TX (US)

(72) Inventors: Yi Fang, Sharon, MA (US); David Scott Thompson, West Hollywood, CA (US); Yidong Wang, Weston, MA (US); Ranjit Kollu, Norfolk, MA (US); Jennifer Minarik, Zionsville, IN (US); Reut Kovetz, Tel Aviv (IL); Ching-Yun Chao, Austin, TX (US); Qi Jin, Sudbury, MA (US); Jonathon Cwik, Chicago, IL (US)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 18/331,770

(22) Filed: Jun. 8, 2023

(65) Prior Publication Data
US 2024/0414169 A1    Dec. 12, 2024

(51) Int. Cl.
*H04L 9/40*    (2022.01)
(52) U.S. Cl.
CPC .......... *H04L 63/105* (2013.01); *H04L 63/104* (2013.01); *H04L 63/20* (2013.01)
(58) Field of Classification Search
CPC ..... H04L 63/105; H04L 63/104; H04L 63/20; H04L 63/102
See application file for complete search history.

(56) References Cited

U.S. PATENT DOCUMENTS 7,080,058 B1    7/2006  Upadhyayula et al.
8,626,481 B1    1/2014  Sundararajan et al.
(Continued)

OTHER PUBLICATIONS

Chao, Ching-Yun. "Software Services with Declarative Resource Modeling and Resource Model Patterns" U.S. Appl. No. 18/048,669, filed Oct. 21, 2022, 47 pages.
(Continued)

*Primary Examiner* — Baotran N To
(74) *Attorney, Agent, or Firm* — Amin, Turocy & Watson, LLP

(57) ABSTRACT

A system can identify an attribute-based access control policy that comprises a pair comprising a permission policy and a condition policy that is associated with performing an operation on a computing resource. The system can identify that the attribute-based access control policy corresponds to a role policy that is associated with the account. The system can determine whether the account and the role policy satisfy the attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource. The system can, in response to determining that the account satisfy the permission policy and the condition policy, perform the operation on the computing resource.

20 Claims, 9 Drawing Sheets

(56) References Cited

U.S. PATENT DOCUMENTS

| | | | |
|---|---|---|---|
| 10,922,423 | B1 | 2/2021 | Rungta et al. |
| 10,944,561 | B1 | 3/2021 | Cahill et al. |
| 11,023,598 | B2 | 6/2021 | Grand |
| 11,108,780 | B2 | 8/2021 | Cohen |
| 11,379,275 | B2 | 7/2022 | Milliron et al. |
| 2005/0021977 | A1* | 1/2005 | Oberst ............... G06F 21/6218 713/182 |
| 2007/0289024 | A1* | 12/2007 | Mohammed .......... H04L 63/101 726/28 |
| 2015/0379061 | A1 | 12/2015 | Paraschivescu |
| 2016/0072814 | A1 | 3/2016 | Martinelli |
| 2018/0349797 | A1 | 12/2018 | Garvey et al. |
| 2021/0084048 | A1* | 3/2021 | Kannan ................ H04L 63/104 |
| 2023/0086475 | A1* | 3/2023 | Mosko ................... H04L 63/20 726/1 |
| 2023/0401332 | A1 | 12/2023 | Vahidnia et al. |
| 2024/0179181 | A1* | 5/2024 | Torlak .................... H04L 63/20 |
| 2024/0179182 | A1* | 5/2024 | Hicks ...................... H04L 63/20 |
| 2024/0179188 | A1* | 5/2024 | Torlak .................. H04L 63/104 |
| 2024/0249008 | A1 | 7/2024 | Inokuchi et al. |

OTHER PUBLICATIONS

Chao, et al. "Scalable Access Control Mechanism" U.S. Appl. No. 17/932,905, filed Sep. 16, 2022, 51 pages.

Hu, et al. "Guide to Attribute Based Access Control (ABAC) Definition and Considerations" NIST Special Publication 800-162 [https://doi.org/10.6028/NIST.SP.800-162], Jan. 2014, 47 pages.

Ferraiolo, et al., "Extensible Access Control Markup Language (XACML) and Next Generation Access Control (NGAC)," Abac '16: Proceedings of the 2016 ACM International Workshop on Attribute Based Access Control, Mar. 2016, 12 pages.

Ferraiolo, et al., "A Comparison of Attribute Based Access Control (ABAC) Standards for Data ServiceApplications" NIST SP 800-178, [http://dx.doi.org/10.6028/NIST.SP.800-178], Oct. 2016, 68 pages.

"Dell EMC OpenManage EnterpriseSupportAssist Version 1.1" [https://dl.dell.com/topicspdf/openmanage-enterprise-supportassist_users-guide2_en-us.pdf], Jun. 2021, 65 pages.

"Scopes" [https://auth0.com/docs/get-started/apis/scopes] retrieved Nov. 3, 2023, 4 pages.

"Cortex XDR Pro Administrator Guide" [https://docs.paloaltonetworks.com/content/dam/techdocs/en_US/pdf/cortex/cortex-xdr/cortex-xdr-pro-admin/cortex-xdr-pro-admin.pdf/cortex-xdr-pro-admin.pdf], retreived Nov. 3, 2023, 776 pages.

"Attribute Based Access Control" National Institute of Standards and Technology, [https://www.nccoe.nist.gov/sites/default/files/legacy-files/abac-fact-sheet.pdf], Sep. 2017, 2 pages.

"Hierarchical and recursive queries in SQL" Wikipedia. [https://en.wikipedia.org/wiki/ Hierarchical_and_recursive_queries_in_SQL#Common_table_expression], retrieved Nov. 30, 2023, 5 pages.

Kivimaki, Petteri. "AWS, Azure, GCP: Resource Hierarchies" [https://levelup.gitconnected.com/aws-azure-gcp-resource-hierarchies-25b829127511] Feb. 9, 2020, 15 pages.

"Hierarchical Data in SQL: The Ultimate Guide" [https://www.databasestar.com/hierarchical-data-sql/] Jun. 2, 2023, 21 pages.

"What are the options for storing hierarchical data in a relational database?" [https://stackoverflow.com/questions/4048151/what-are-the-options-for-storing-hierarchical-data-in-a-relational-database], retrieved Nov. 3, 2023, 11 pages.

Monge, Alvaro. "Database design with UML and SQL, 4th edition" [https://web.csulb.edu/colleges/coe/cecs/dbdesign/dbdesign.php?page=intro.html], retrieved Nov. 3, 2023, 2 pages.

Goyal, et al. "Authorization Decisions Using Conditioned Permissions for Resource Collections" U.S. Appl. No. 18/364,939, filed Aug. 3, 2023, 53 pages.

"Jabbar et al. ""Dynamic Visibility and Authorization Policymanagement for a Cloud Service Platform"" U.S. Appl. No. 18/350,149, filed Jul. 11, 2023, 59 pages.".

"Acme Laboratories" [https://www.acme.com/], retrieved Dec. 1, 2023, 2 pages.

"Azure Policy definition structure" [https://learn.microsoft.com/en-us/azure/governance/policy/concepts/definition-structure], Aug. 15, 2023, 34 pages.

"Azure policyRule schema" [https://schema.management.azure.com/schemas/2020-10-01/policyDefinition.json], retrieved Dec. 1, 2023, 2 pages.

"Policy-based control for cloud native environments" Open Policy Agent. [https://www.openpolicyagent.org/], retrieved Dec. 1, 2023, 6 pages.

Sathaye, et al. "Self-Tagging", U.S. Appl. No. 18/627,118, filed Apr. 4, 2024, 43 pages.

Chao, et al. "Policy-Based Tagging Governance for Cloud Resource Lifecycle Management" U.S. Appl. No. 18/639,707, filed Apr. 18, 2024, 47 pages.

Sawal, et al. "Meta-Tagging Based Configuration Transformation for Heterogeneous Systems" U.S. Appl. No. 18/639,737, filed Apr. 18, 2024, 47 pages.

Courcelle, Bruno. "Graph equivalences and decompositions definable in Monadic Second-Order Logic. The case of Circle Graphs" presented at Proc. of ICDM, Jul. 24, 2006, 15 pages.

Thomas, Wolfgang. "Languages, Automata, and Logic" May 1996, In Handbook of Formal Languages, vol. 3: Beyond Words. New York NY: Springer-Verlag, 75 pages.

Office Action mailed Dec. 5, 2023 for U.S. Appl. No. 18/048,669, 27 pages.

Notice of Allowance mailed May 13, 2024 for U.S. Appl. No. 18/048,669, 33 pages.

Dasika, et al. "Data Center Monitoring and Management Operation Including a Data Tag Association Tracking Operation" U.S. Appl. No. 18/374,225, filed Sep. 28, 2023, 66 pages.

Guertin, et al. "Data Center Monitoring and Management Operation Including a Data Tag Management Operation" U.S. Appl. No. 18/241,030, filed Aug. 31, 2023, 73 pages.

Realegeno, et al. "User-Configurable Autotagging Policies" U.S. Appl. No. 18/241,040, filed Aug. 31, 2023, 71 pages.

Earley, et al. "Data Center Monitoring and Management Operation Including a Protected Data Tag Operation" U.S. Appl. No. 18/374,230, filed Sep. 28, 2023, 68 pages.

Sathaye, et al. "System and Methods for Dynamic Tags", U.S. Appl. No. 18/374,231, filed Sep. 28, 2023, 66 pages.

Office Action mailed Apr. 14, 2025 for U.S. Appl. No. 17/932,905, 52 pages.

Notice of Allowance mailed Apr. 8, 2025 for U.S. Appl. No. 18/364,939, 44 pages.

Office Action mailed May 29, 2025 for U.S. Appl. No. 18/627,118, 24 pages.

\* cited by examiner

700 ↴

( 702 )
↓

IN RESPONSE TO RECEIVING A REQUEST ASSOCIATED WITH AN ACCOUNT TO PERFORM AN OPERATION ON A COMPUTING RESOURCE, IDENTIFYING AN ATTRIBUTE-BASED ACCESS CONTROL POLICY THAT COMPRISES A PAIR COMPRISING A PERMISSION POLICY AND A CONDITION POLICY THAT IS ASSOCIATED WITH PERFORMING THE OPERATION ON THE COMPUTING RESOURCE, WHEREIN THE IDENTIFYING IS PERFORMED INDEPENDENTLY OF AN IDENTIFICATION OF THE ACCOUNT 704

↓

IDENTIFYING THAT THE ATTRIBUTE-BASED ACCESS CONTROL POLICY CORRESPONDS TO A ROLE POLICY THAT IS ASSOCIATED WITH THE ACCOUNT 706

↓

DETERMINING WHETHER THE ACCOUNT AND THE ROLE POLICY SATISFY THE FIRST ATTRIBUTE-BASED ACCESS CONTROL POLICY WITH RESPECT TO THE OPERATION, WHEREIN THE DETERMINING COMPRISES EVALUATING WHETHER THE COMPUTING RESOURCE AND A REQUIRED PERMISSION OF THE PERMISSION POLICY IS DECLARED IN THE ROLE POLICY, AND EVALUATING WHETHER THE ACCOUNT AND THE ROLE POLICY SATISFY THE CONDITION POLICY EVALUATES TO TRUE BASED ON ATTRIBUTES OF THE ACCOUNT AND ATTRIBUTES OF THE COMPUTING RESOURCE 708

↓

IN RESPONSE TO DETERMINING THAT THE ACCOUNT SATISFIES THE PERMISSION POLICY AND THE CONDITION POLICY, PERFORMING THE OPERATION ON THE COMPUTING RESOURCE 710

IDENTIFYING AN ATTRIBUTE-BASED ACCESS CONTROL POLICY THAT COMPRISES A PAIR COMPRISING A PERMISSION POLICY AND A CONDITION POLICY THAT IS ASSOCIATED WITH PERFORMING AN OPERATION ON A COMPUTING RESOURCE, WHEREIN THE IDENTIFYING IS PERFORMED INDEPENDENTLY OF AN IDENTIFICATION OF AN ACCOUNT 804

IDENTIFYING THAT THE ATTRIBUTE-BASED ACCESS CONTROL POLICY CORRESPONDS TO A ROLE POLICY THAT IS ASSOCIATED WITH THE ACCOUNT 806

DETERMINING WHETHER THE ACCOUNT AND THE ROLE POLICY SATISFY THE FIRST ATTRIBUTE-BASED ACCESS CONTROL POLICY WITH RESPECT TO THE OPERATION, WHEREIN THE DETERMINING COMPRISES EVALUATING WHETHER THE COMPUTING RESOURCE AND A REQUIRED PERMISSION OF THE PERMISSION POLICY IS DECLARED IN THE ROLE POLICY, AND EVALUATING WHETHER THE ACCOUNT AND THE ROLE POLICY SATISFY THE CONDITION POLICY EVALUATES TO TRUE BASED ON ATTRIBUTES OF THE ACCOUNT AND ATTRIBUTES OF THE COMPUTING RESOURCE 808

IN RESPONSE TO DETERMINING THAT THE ACCOUNT SATISFIES THE PERMISSION POLICY AND THE CONDITION POLICY, PERFORMING THE OPERATION ON THE COMPUTING RESOURCE 810

ATTRIBUTE-BASED ACCESS CONTROL USING SCOPED ROLES AND CONDITIONED PERMISSIONS DYNAMIC POLICIES

BACKGROUND

Computer systems can provide access to computer resources. Access to these computer resources can be restricted to authorized user accounts.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a request associated with an account to perform an operation on a computing resource. The system can identify an attribute-based access control policy that comprises a pair comprising a permission policy and a condition policy that is associated with performing the operation on the computing resource, wherein the identifying is performed independently of an identification of the account, wherein the permission policy comprises a first Boolean expression of one or more permissions, and wherein the condition policy comprises a second Boolean expression of one or more conditions. The system can identify that the attribute-based access control policy corresponds to a role policy that is associated with the account that is associated with performing the operation on the computing resource, wherein the role policy identifies a group of roles, wherein a role of the group of roles comprises a group of permissions, and wherein the group of roles is scoped to a group of resource groups. The system can determine whether the account and the role policy satisfy the attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource. The system can, in response to determining that the account satisfies the permission policy and the condition policy, perform the operation on the computing resource.

An example method can comprise, in response to receiving a request associated with an account to perform an operation on a computing resource, identifying, by a system comprising a processor, an attribute-based access control policy that comprises a pair comprising a permission policy and a condition policy that is associated with performing the operation on the computing resource, wherein the identifying is performed independently of an identification of the account. The method can further comprise identifying, by the system, that the attribute-based access control policy corresponds to a role policy that is associated with the account. The method can further comprise determining, by the system, whether the account and the role policy satisfy the first attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource. The method can further comprise, in response to determining that the account satisfies the permission policy and the condition policy, performing, by the system, the operation on the computing resource.

An example non-transitory computer-readable medium can comprise instructions that, in response to execution, cause a system comprising a processor to perform operations. These operations can comprise identifying an attribute-based access control policy that comprises a pair comprising a permission policy and a condition policy that is associated with performing an operation on a computing resource, wherein the identifying is performed independently of an identification of an account. These operations can further comprise identifying, by the system, that the attribute-based access control policy corresponds to a role policy that is associated with the account. These operations can further comprise determining, by the system, whether the account and the role policy satisfy the first attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource. These operations can further comprise, in response to determining that the account satisfies the permission policy and the condition policy, performing, by the system, the operation on the computing resource.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates another example process flow that can facilitate attribute-based access control using scoped rules and conditioned permissions dynamic policies, in accordance with an embodiment of this disclosure;

FIG. 8 illustrates another example process flow that can facilitate attribute-based access control using scoped rules and conditioned permissions dynamic policies, in accordance with an embodiment of this disclosure;

DETAILED DESCRIPTION

Overview

Figure 1:
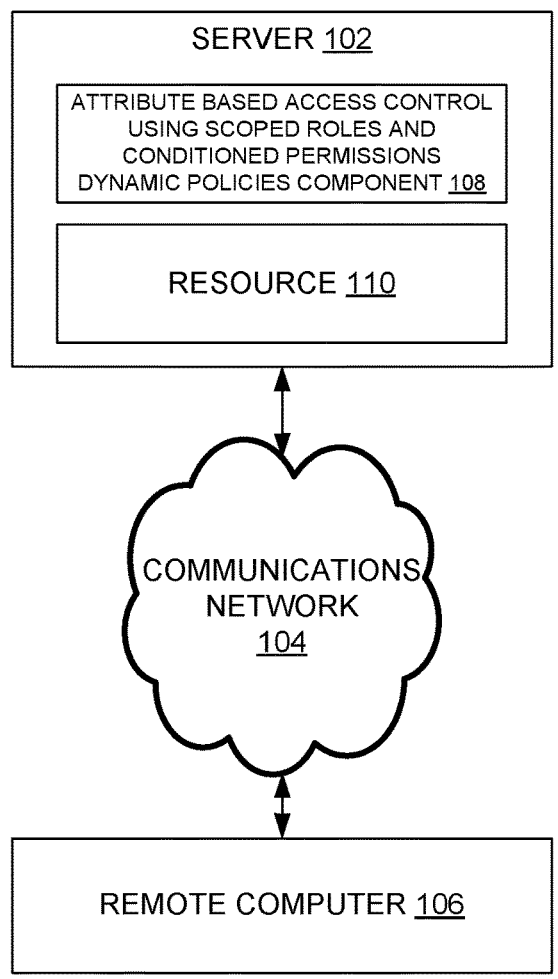
FIG. 1 illustrates an example system architecture that can facilitate attribute-based access control using scoped rules and conditioned permissions dynamic policies, in accordance with an embodiment of this disclosure.

An attribute-based access control (ABAC) mechanism can comprise an access control method where subject requests to perform operations on objects are granted or denied based on assigned attributes of the subject, assigned attributes of the object, environment conditions, and a set of policies that are specified in terms of those attributes and conditions. Prior approaches can lack a comprehensive access control framework that can resolve the access control requirements of complex and large-scale business management scenarios.

A prior approach can decompose an ABAC system into three building blocks: (1) an attribute-based resource modeling (ABRM) stage, (2) a scope based access control (SBAC) stage, and (3) a role based access control stage (RBAC) stage.

Another prior approach can describe a declarative resource modeling language that can be used to create a resource model of an arbitrarily complex business system using a set of resource model patterns. This can reduce an attribute-based resource modeling design problem into a mechanical process.

The present techniques can be implemented to realize an ABAC system.

Various scenarios can benefit from an ABAC approach, such as multi-cloud data management, and a multi-cloud active management platform.

A scenario can include where a class 1 user can delete all resources of an organization, and a class 2 user can delete only its own resources. This can be a usage example of an access control decision based on a user attribute. This can be referred to herein as Scenario 1.

Another scenario can involve a resource group that is an arbitrary collection of resources. A user can be granted some roles that can access some resource groups. Let there be 10 resource groups (numbered 1-10). Specifically, a user can be granted a role to modify resource groups 9 and 10. The user can also be granted a role to view resource groups 1 and 2. This can be an example of an access control decision based on resource attributes. This can be referred to herein as Scenario 2.

The present techniques can facilitate new ABAC policy expressions that can formulate a solution to above use cases. The polices can involve using a mixture of user attributes and resource attributes in making access control decisions. The policy expressions can cover broader ABAC use cases, as well. In some examples, these policies can be applied and removed dynamically on demand.

Prior approaches that utilize Role Based Access Control techniques can be insufficient for the scale and complexity of next-generation business management access control scenarios. Prior techniques that utilize ABAC can do so at a high-level architecture and building block design with an objective to build a policy-driven access control approach that dynamically evaluates attributes of subject, object, and contextual data to make and enforce access control decision to tackle the scale of next generation business management systems. These approaches can lack a detail of design, while having a high-level goal of developing a set of policies that are specified in terms of those attributes and conditions can lead to overly complex policy language and increasing management complexity. Prior approaches can use Scope Based Access Control (SBAC) approaches to enhance RBAC techniques in various ways, such as on a set of objects in some examples, or on a set of permissions in other examples.

That is, prior approaches can lack a single, complete, unified, and consistent architecture design that can satisfy general complex business management access control requirements.

Some prior approaches attach a policy to an object. A general policy statement can specify a principal (e.g., account, user, or role), actions allowed or denied, a list of resources, and optional condition(s) on permissions. It can be that these prior approaches do not differentiate actions from permissions.

In these prior approaches, a condition can be an attribute (e.g., "Condition": {"Bool": {"MultiFactorAuthPresent": "true" }}). and an action can be a list of actions (e.g., permissions).

In these prior approaches, a principal can be an account, a user, a role, or a federated user, and a resource can be a list of resources.

With the present techniques, a resource access control policy of conditioned permissions can be attached to a resource. Here, permissions can comprise a Boolean expression of permissions (e.g., !(Permission1||Permission2)||Permission3 && Permission4), and conditions can comprise a Boolean expression of conditions.

In the present techniques, roles can comprise a collection of permissions. Roles can be scoped to set of resources. Scoped roles can be granted to users. In some examples, resources are associated with organizations and users, but not to roles. A scope can comprise a Boolean expression of resources. A condition can comprise a function. For example, a condition Match_User can validate whether a user owns the specified resource-group.

As a direct comparison, the present techniques can implement a policy attachment where a permission policy is attached to resources and a role policy is attached to users. In contrast, prior approaches can attach a policy to objects. The present techniques can implement a policy statement where a role is a collection of permissions, where permissions can be constrained by conditions, and roles can be scoped to resources. In contrast, prior approaches can implement a policy statement that specifies a principal, actions allowed or denied, a list of resources, and an optional condition on permissions.

The present techniques can implement a condition as a function, while prior techniques can implement a condition as an attribute. The present techniques can implement conditions as a Boolean expression of conditions, while prior approaches omit this feature. The present techniques can implement permissions as a Boolean expression of permissions, while prior approaches implement permissions as a list of actions. The present techniques can implement scope as a Boolean expression of resources, while prior approaches utilize a resource as a list of resources.

The present techniques can facilitate a policy model that is different from that of prior approaches. In contrast to prior approaches, the present techniques can implement a permission condition as a function (E.g., Match_User). With prior techniques, a permission condition can be a property.

An advantage of implementing a permission condition as a function can be that, having a function to validate a condition can add flexibility to support arbitrarily complex conditions. Another advantage can be that dynamically loading a function to authorization service can facilitate a flexibility in adding new conditions dynamically.

The present techniques can also be implemented to facilitate using permissions, conditions, and scope as Boolean expressions, while prior art actions and resources are lists of actions and resources. The present techniques can be more flexible.

The present techniques can be implemented to provide the following. Conditioned permissions and scoped roles can be blocks of a modern Attribute-Based Access Control system. Conditioned permissions can require that a requesting user not only to have the required permissions but also satisfy required conditions that can be evaluated based on relationships and attributes of the requesting user and of the specified resource(s). Scoped roles can put constraints on roles that are granted to a user such that roles can only apply to the specified resource(s).

Example Architectures

FIG. 1 illustrates an example system architecture 100 that can facilitate attribute-based access control using scoped rules and conditioned permissions dynamic policies in accordance with an embodiment of this disclosure.

System architecture 100 comprises server 102, communications network 104, and remote computer 106. In turn, server 102 comprises attribute-based access control using scoped rules and conditioned permissions dynamic policies component 108 and resource 110.

Figure 9:
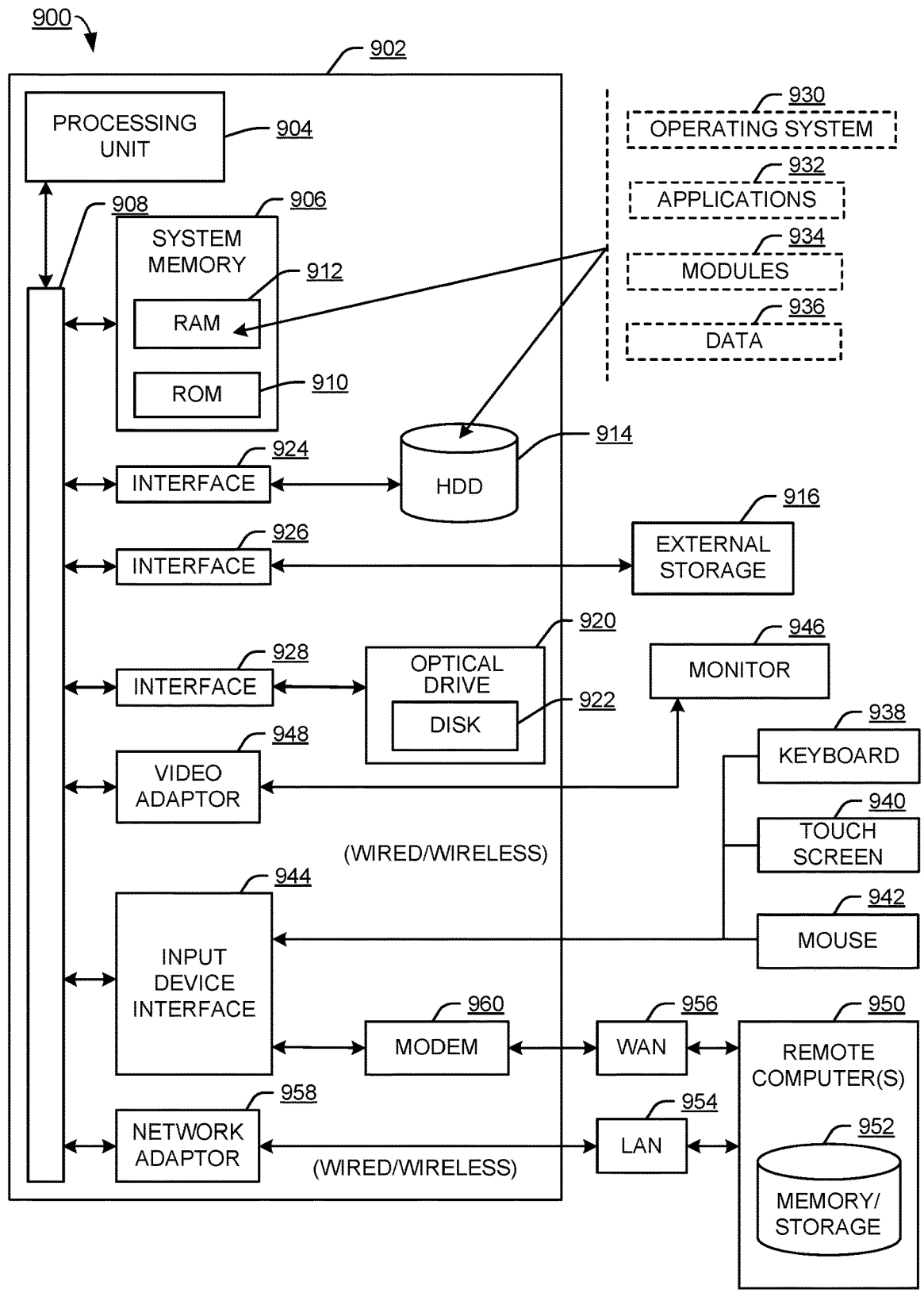
FIG. 9 illustrates an example block diagram of a computer operable to execute an embodiment of this disclosure.

Each of server 102 and/or remote computer 106 can be implemented with part(s) of computing environment 900 of FIG. 9. Communications network 104 can comprise a computer communications network, such as the Internet.

Remote computer 106 can contact server 102 via communications network 104 to access resource 110, which can comprise resources such as a microservice that can be invoked, or a stored file. Attribute-based access control using scoped rules and conditioned permissions dynamic policies component 108 can apply ABAC policies, such as those with conditioned permissions, to determine whether to allow or deny remote computer 106 access to resource 110.

In some examples, attribute-based access control using scoped rules and conditioned permissions dynamic policies component 108 can implement part(s) of the process flows of FIGS. 5-8 to implement attribute-based access control using scoped rules and conditioned permissions dynamic policies.

It can be appreciated that system architecture 100 is one example system architecture for attribute-based access control using scoped rules and conditioned permissions dynamic policies, and that there can be other system architectures that facilitate attribute-based access control using scoped rules and conditioned permissions dynamic policies.

Figure 2:
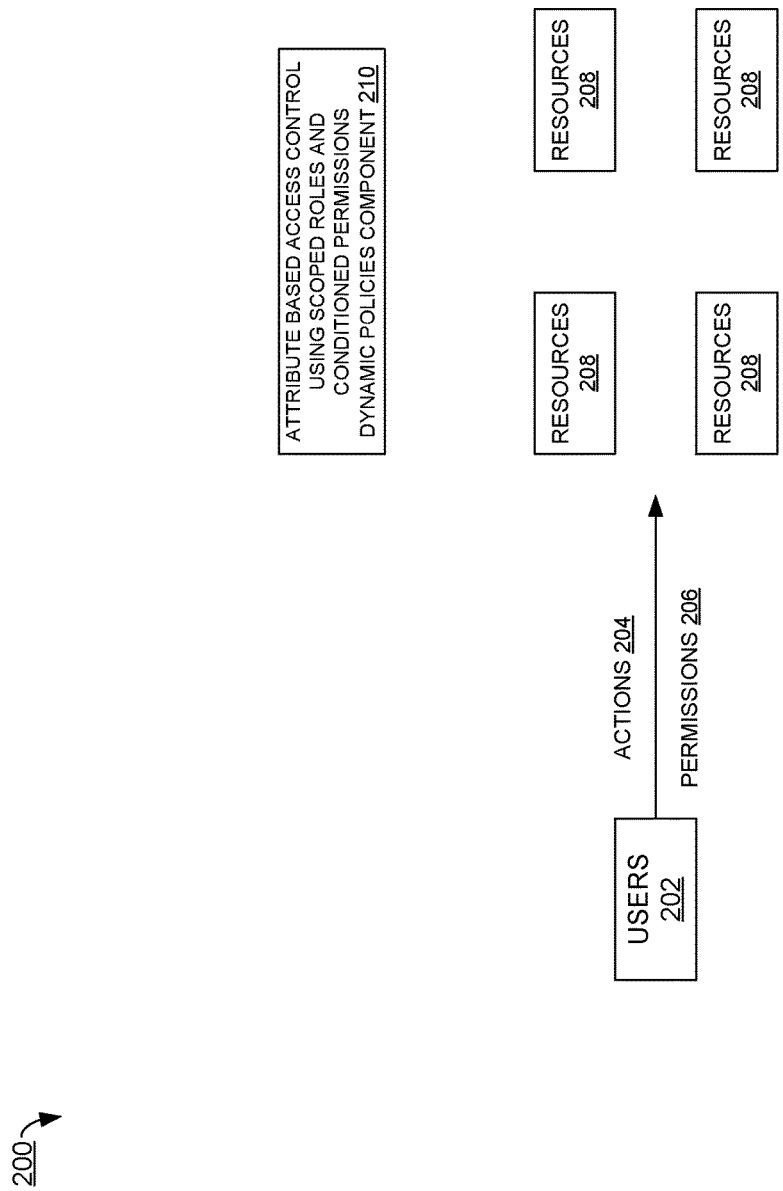
FIG. 2 illustrates an example system architecture that includes users, resources, actions, and permissions, and that can facilitate attribute-based access control using scoped rules and conditioned permissions dynamic policies, in accordance with an embodiment of this disclosure.

FIG. 2 illustrates an example system architecture 200 that includes users, resources, actions, and permissions, and that can facilitate attribute-based access control using scoped rules and conditioned permissions dynamic policies, in accordance with an embodiment of this disclosure. In some examples, part(s) of system architecture 200 can be used by part(s) of system architecture 100 of FIG. 1 to facilitate attribute-based access control using scoped rules and conditioned permissions dynamic policies.

System architecture 200 comprises users 202, actions 204, permissions 206, resources 208, and attribute-based access control using scoped rules and conditioned permissions dynamic policies component 210.

Attribute-based access control using scoped rules and conditioned permissions dynamic policies component 210 can be similar to attribute-based access control using scoped rules and conditioned permissions dynamic policies component 108 of FIG. 1.

As shown in the example of FIG. 2, users 202 can perform actions 204 on resources 208 if and only if users have the required permissions 206. In some examples, a user of users 202 can be associated with remote computer 106 of FIG. 1; resources 208 can be similar to resource 110; actions 204 can be those actions that can be taken on resources 208 (e.g., invoke an operation, or delete a file); and permissions 206 can be permissions enforced by attribute-based access control using scoped rules and conditioned permissions dynamic policies component 108.

The example of Scenario 1 involves two classes of users 202. A Class 1 user can delete, or more generally manage, all resources of an organization, and Class 2 users can only delete (or manage in general) their own resources in the organization. In other words, for the same delete (or manage) permission, Class 1 and Class 2 users can apply the delete (or manage) permission to resources of an organization or resources of the specific user. In this use case, whether a user can perform a delete (or manage) action on a resource can depend on whether the user owns the specific resource, and whether the user is a Class 1 user or a Class 2 user. That is, it can be not only the user must have the required delete permission, but that the user must also satisfy the Class 1 or Class 2 condition.

The present techniques can utilize a conditioned permission policy construct. Prior techniques can involve adding a condition to an access control policy. The present techniques can formulate the condition in a new way. An example conditioned permission can be described in the list below. An example syntax is expressed in both Yet Another Markup Language (YAML) and JavaScript Object Notation (JSON) formats.

An example of conditioned permissions in a YAML format is:

```
---
DELETE /rest/v1/api-access-keys/{Id}:
-
permissions: "Delete_Access_Key"
conditions: "Match_User && Match_Organization"
-
permissions: "Delete_Access_Key && Class1_Permission"
conditions: "Match_Organization"
```

An example of conditioned permissions in a JSON format is:

```
{
"DELETE /rest/v1/api-access-keys/{Id}": [
  {
    "permissions": "Delete_Access_Key",
    "conditions": "Match_User && Match_Organization"
  },
  {
```

-continued

```
        permissions": "Delete_Access_Key && Class1_Permission",
        "conditions": "Match_Organization"
      }
    ]
}
```

Shown in this example, to delete a specified application programming interface (API) access key resource, a user must satisfy one of the two conditioned permissions. Note that in this example, an API access key is owned by one and exactly one user under one and only one organization.

One of the conditioned permissions is that a user must have the required Delete_Access_Key permission. If the user is not a Class 1 user (that is, the user does not have the Class1_Permission), then the user must be in the same organization as the specified API access Key (that is, Match_Organization), and the user must be the owner of the specified API Access Key (that is, Match_User).

The permission is an attribute a user can have. A condition such as Match_Organization and Match_User can be viewed as code, e.g., a code procedure, that an authorization service can use to evaluate whether a user meets the required condition. More specifically, a Match_Organization procedure can check whether the requesting user and the specified resource are both under the same organization.

A Match_User procedure can check whether the requesting user owns the specified resource.

For users who have the Class1_Permission, meaning the user is a Class 1 User, it can be that the requesting user only need to satisfy the Match_Organization condition.

The present techniques can be implemented to facilitate conditioned permissions. While required permissions can be attributes that a user must have, users can also need to satisfy additional conditions of the permissions which can be validated via code (that is, procedures).

Figure 3:
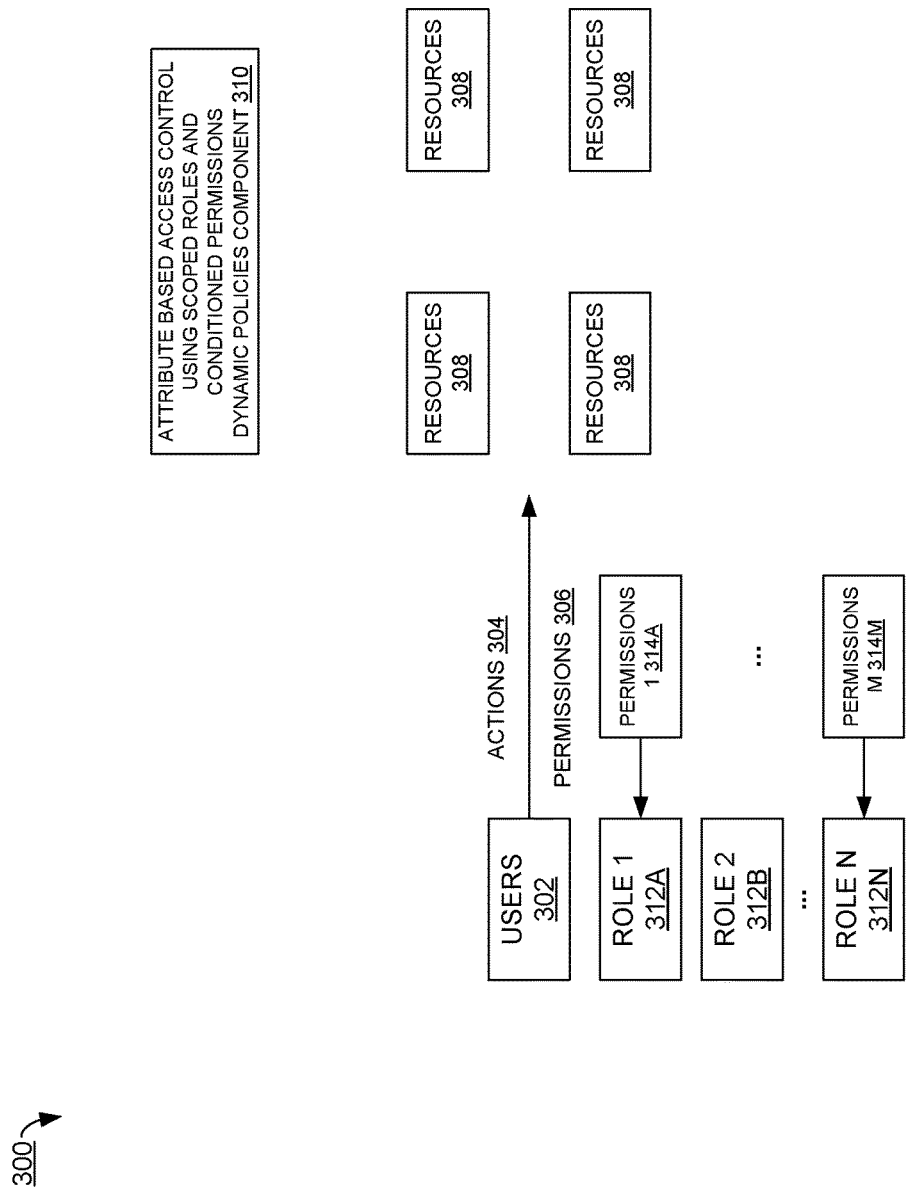
FIG. 3 illustrates an example system architecture that includes roles as a group of permissions, and that can facilitate attribute-based access control using scoped rules and conditioned permissions dynamic policies, in accordance with an embodiment of this disclosure.

FIG. 3 illustrates an example system architecture 300 that includes roles as a group of permissions, and that can facilitate attribute-based access control using scoped rules and conditioned permissions dynamic policies, in accordance with an embodiment of this disclosure. In some examples, part(s) of system architecture 300 can be used by part(s) of system architecture 100 of FIG. 1 to facilitate attribute-based access control using scoped rules and conditioned permissions dynamic policies.

System architecture 300 comprises users 302 (which can be similar to users 202 of FIG. 2), actions 304 (which can be similar to actions 204), permissions 306 (which can be similar to permissions 206), resources 308 (which can be similar to resources 208), attribute-based access control using scoped rules and conditioned permissions dynamic policies component 310 (which can be similar to attribute-based access control using scoped rules and conditioned permissions dynamic policies component 210), role 1 312A, role 2 312B, role N 312N, permissions 314A, and permissions 314M.

A second use case can introduce a notion of resource group which can represent a collection of resources. In other words, a resource group can form a basic unit of resource management. One way that users can form an arbitrary resource group can be to assign a label to resources. Resources that share the same label can form a resource group. A user can be the owner of a resource group, or, more generally, have other relationships with those resources.

A role (e.g., role 1 312A) can comprise a set of permissions. A user of users 302 can be granted zero or more roles (e.g., role 1 312A and/or role 2 312B).

In Scenario 2, a user can be granted some roles to manage some groups. This use case can indicate that, while a user can be granted required roles (i.e., sets of permissions), whether that user can perform some actions on a resource group can also depend on whether the user has the required relationship with the specified resource group. To resolve this access control problem, scoped roles can be implemented.

Scoped roles can indicate that roles granted to a user can be scoped to certain resources, e.g., resource groups. Example scoped roles policy syntax in YAML and in JSON formats are as follows.

An example of scoped roles in a YAML format is:

```
- roles: Reader && Writer
  scope: Resource_Group_9 && Resource_Group_10
- roles: Reader
  scope: Resource_Group_1 && Resource_Group_2
```

An example of scoped roles in a JSON format is:

```
[
  {
    "roles": "Reader",
    "scope": "Resource_Group_1 && Resource_Group_2"
  },
  {
    "roles": "Reader && Writer",
    "scope": "Resource_Group_9 && Resource_Group_10" },
]
```

In these examples, a user is granted both reader role and writer role to resource groups 8 and 10. The user is also granted the reader role to resource groups 1 and 2. Put another way, the user cannot access resource groups 3 through 8.

To enforce access control, the associated conditioned permissions, expressed in a YAML format, can be as follows:

```
- 'GET /rest/v1/resource-groups/{Id}':
  - permissions: Reader_Permission
    conditions: Match_Organization && Match_Resource_Group
- 'UPDATE /rest/v1/resource-groups/{Id}':
  - permissions: Reader_Permission && Writer_Permission
    conditions: Match_Organization && Match_Resource_Group
```

To enforce access control, the associated conditioned permissions, expressed in a JSON format, can be as follows:

```
[
  {
    "GET /rest/v1/resource-groups/{Id}": [
      {
        "permissions": "Reader_Permission",
        "conditions": "Match_Organization && Match_Resource_Group"
      }
    ]
  },
  {
    "UPDATE /rest/v1/resource-groups/{Id}": [
      {
        "permissions": "Reader_Permission && Writer_Permission",
```

```
"        conditions": "Match_Organization && Match_Resource_Group"
    }
  ]
}
]
```

A Match_Resource_Group condition can check whether a requesting user has owner relationship with a specified Resource Group.

Figure 4:
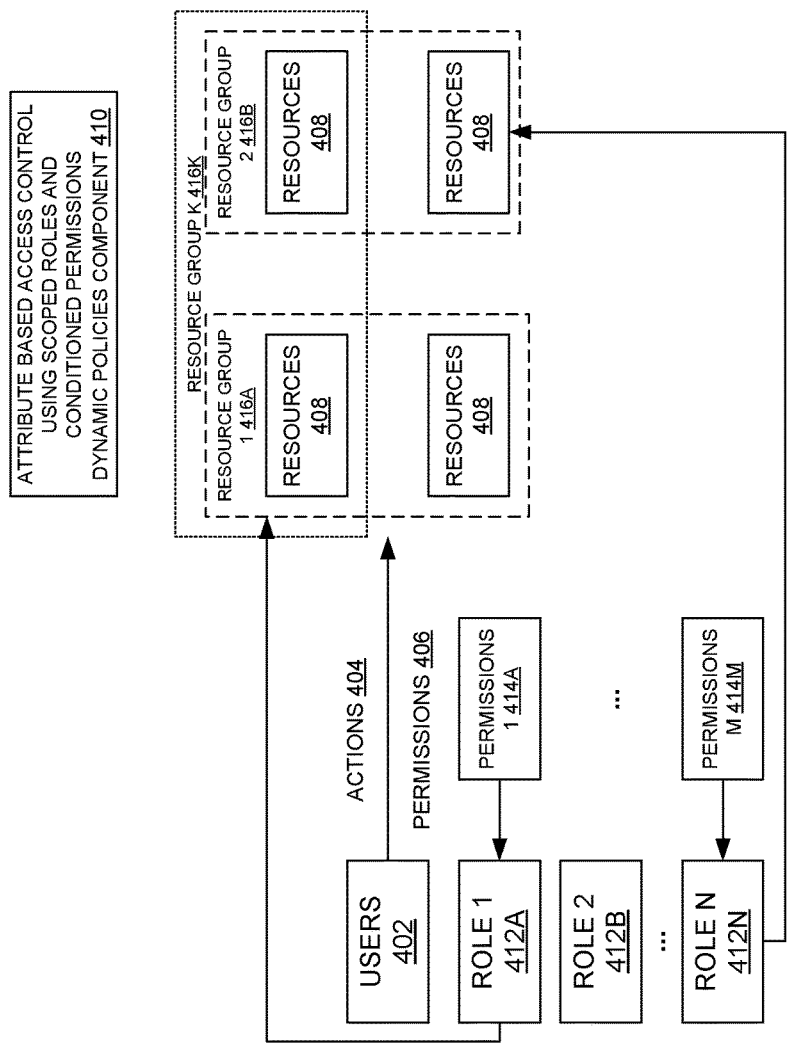
FIG. 4 illustrates an example system architecture that includes resource groups and scoped roles, and that can facilitate attribute-based access control using scoped rules and conditioned permissions dynamic policies, in accordance with an embodiment of this disclosure.

FIG. 4 illustrates an example system architecture 400 that includes resource groups and scoped roles, and that can facilitate attribute-based access control using scoped rules and conditioned permissions dynamic policies, in accordance with an embodiment of this disclosure. In some examples, part(s) of system architecture 400 can be used by part(s) of system architecture 100 of FIG. 1 to facilitate attribute-based access control using scoped rules and conditioned permissions dynamic policies.

System architecture 400 comprises users 402 (which can be similar to users 202 of FIG. 2), actions 404 (which can be similar to actions 404), permissions 406 (which can be similar to permissions 206), resources 408 (which can be similar to resources 208), attribute-based access control using scoped rules and conditioned permissions dynamic policies component 410 (which can be similar to attribute-based access control using scoped rules and conditioned permissions dynamic policies component 210), role 1 412A (which can be similar to role 1 312A), role 2 412B (which can be similar to role 2 312B), role N 312N (which can be similar to role N 312N), permissions 414A (which can be similar to permissions 314A), permissions 414M (which can be similar to permissions 314M), resource group 1 416A, resource group 2 416B, and resource group K 416K.

The example of FIG. 4 can illustrate a concept of roles granted to a user that are scoped to specified resource groups (e.g., resource group 1 416A).

The present techniques can be new in scoping roles to selected resources, and a mechanism of formulating the policies and the mechanism of enforcement of the policies.

It can be appreciated that the present techniques can be applied beyond resource groups. For example, let there be a scenario where there is a desire for a Manager Role to manage all resources of an organization. A user can be granted a scoped Manager Role as follows, expressed in a YAML format:
roles: Manager scope: Organization In another scenario, there can be a desire to grant a Destroyer Role to a user to perform cleaning up maintenance type of work on all resources. An example scoped role example can be as follows, expressed in a YAML format:
roles: Destroyer scope: All This explicit policy can make it clear that the role can apply to all resources. An alternative can be to remove the All scope and assume that a role without an explicit scope can, by default, apply to all resources.

Figure 5:
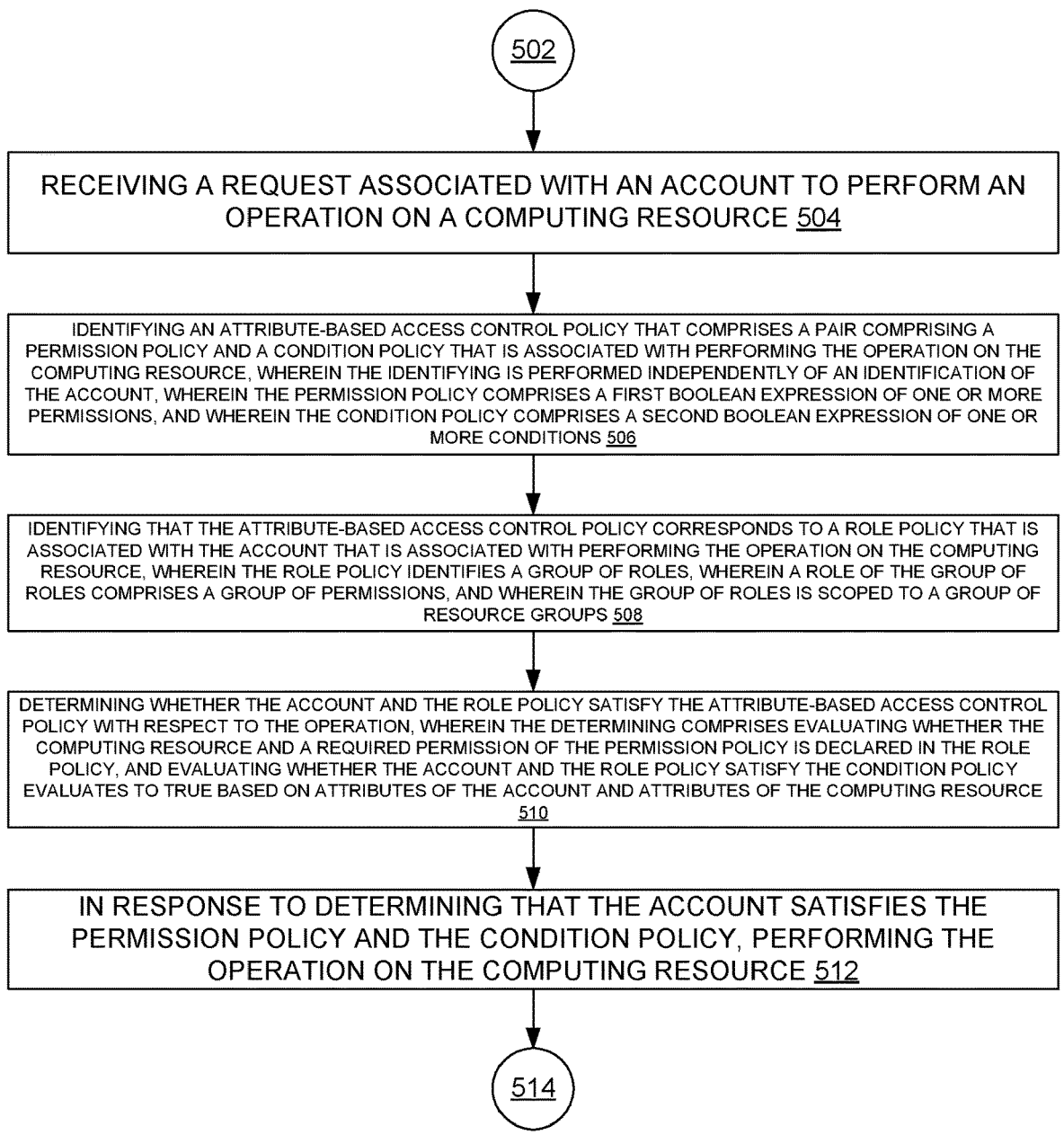
FIG. 5 illustrates an example process flow that can facilitate attribute-based access control using scoped rules and conditioned permissions dynamic policies, in accordance with an embodiment of this disclosure.

In another scenario for testing, a scoped role example can be as follows, expressed in a YAML format:
roles: Watcher scope: None Example Process Flows FIG. 5 illustrates an example process flow 500 that can facilitate attribute based access control using scoped rules and conditioned permissions dynamic policies, in accordance with an embodiment of this disclosure. In some examples, one or more embodiments of process flow 500 can be implemented by attribute based access control using scoped rules and conditioned permissions dynamic policies component 108 of FIG. 1, or computing environment 900 of FIG. 9.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, process flow 700 of FIG. 7, and/or process flow 800 of FIG. 8.

Process flow 500 begins with 502, and moves to operation 504.

Operation 504 depicts receiving a request associated with an account to perform an operation on a computing resource. Using the example of FIG. 1, an account associated with remote computer 106 can make a request to server 102 to perform an operation on resource 110. In some examples, this account can be a user account, or a service account.

After operation 504, process flow 500 moves to operation 506.

Operation 506 depicts identifying an attribute-based access control policy that comprises a pair comprising a permission policy and a condition policy that is associated with performing the operation on the computing resource, wherein the identifying is performed independently of an identification of the account, wherein the permission policy comprises a first Boolean expression of one or more permissions, and wherein the condition policy comprises a second Boolean expression of one or more conditions. That is, conditioned permissions can be looked up for the account performing the operation.

After operation 506, process flow 500 moves to operation 508.

Operation 508 depicts identifying that the attribute-based access control policy corresponds to a role policy that is associated with the account that is associated with performing the operation on the computing resource, wherein the role policy identifies a group of roles, wherein a role of the group of roles comprises a group of permissions, and wherein the group of roles is scoped to a group of resource groups.

In some examples, the computing resource is a member of a resource group, and the account satisfies the permission with respect to the resource group. That is, a resource group can comprise an arbitrary collection of resources. An account can be granted some roles that can access some resource groups.

In some examples, a label associated with the computing resource indicates that the computing resource is a member of the resource group. That is, it can be that resources that share a same label can form a resource group.

After operation 508, process flow 500 moves to operation 510.

Operation 510 depicts determining whether the account and the role policy satisfy the attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource. That is, it can be evaluated whether the permission is satisfied.

The present techniques can be implemented to require a requester to satisfy a set of one or more pairs of permissions and conditions. Where the requester satisfies at least one pair of permissions and conditions, then authorization to perform operations on the resource(s) can be granted. In each pair, "permissions" can comprise a Boolean expression of one or more permissions and "conditions" can comprise a Boolean expression of one or more conditions. For example, permissions=permission_1 && (permission_2||permissions_3). This can alternatively be expressed as permissions=permission_1 AND (permission_2 OR permission_3).

After operation 510, process flow 500 moves to operation 512.

Operation 510 depicts determining whether the account satisfies the condition with respect to the operation, wherein the condition comprises computer-executable code that is evaluated to determine whether the account is authorized to perform the operation. That is, it can be evaluated whether the condition is satisfied.

Similarly to permissions, for example, conditions=Condition_1 (Condition_2 && Condition_3).

After operation 510, process flow 500 moves to operation 512.

Operation 512 depicts, in response to determining that the account satisfies the permission policy and the condition policy, performing the operation on the computing resource. That is, where both the permission policy and the condition policy are satisfied, then the operation can be performed.

After operation 512, process flow 500 moves to 514, where process flow 500 ends.

Figure 6:
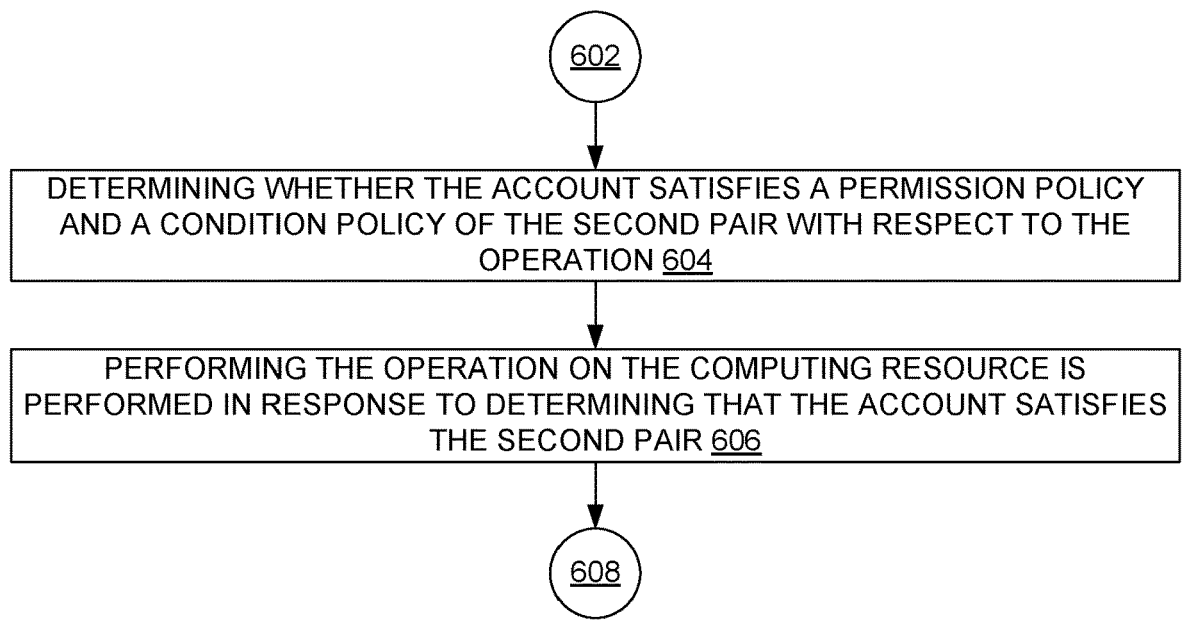
FIG. 6 illustrates another example process flow that can facilitate attribute-based access control using scoped rules and conditioned permissions dynamic policies, in accordance with an embodiment of this disclosure.

FIG. 6 illustrates an example process flow 600 that can facilitate attribute based access control using scoped rules and conditioned permissions dynamic policies, in accordance with an embodiment of this disclosure. In some examples, one or more embodiments of process flow 600 can be implemented by attribute based access control using scoped rules and conditioned permissions dynamic policies component 108 of FIG. 1, or computing environment 900 of FIG. 9.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 700 of FIG. 7, and/or process flow 800 of FIG. 8.

In some examples where process flow 600 is implemented in conjunction with process flow 500 of FIG. 5, the pair is a first pair, and the attribute-based access control policy comprises a second pair.

Process flow 600 begins with 602, and moves to operation 604.

Operation 604 depicts determining whether the account satisfies a permission policy and a condition policy of the second pair with respect to the operation. That is, there can be multiple permissions on a resource, like in the example of "Delete_Access_Key && Class1_Permission."

After operation 604, process flow 600 moves to operation 606.

Operation 606 depicts performing the operation on the computing resource is performed in response to determining that the account satisfies the second pair. That is, it can be that performing the operation is performed where both permissions are met.

Together, operations 604-706 can comprise determining whether the account satisfies a permission policy and a condition policy of the second pair with respect to the operation, wherein performing the operation on the computing resource is performed in response to determining that the account satisfies the second pair.

After operation 606, process flow 600 moves to 608, where process flow 600 ends.

FIG. 7 illustrates an example process flow 700 that can facilitate attribute based access control using scoped rules and conditioned permissions dynamic policies, in accordance with an embodiment of this disclosure. In some examples, one or more embodiments of process flow 700 can be implemented by attribute based access control using scoped rules and conditioned permissions dynamic policies component 108 of FIG. 1, or computing environment 900 of FIG. 9.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 500 of FIG. 5, process flow 600 of FIG. 6, and/or process flow 800 of FIG. 8.

Process flow 700 begins with 702, and moves to operation 704.

Operation 704 depicts, in response to receiving a request associated with an account to perform an operation on a computing resource, identifying an attribute-based access control policy that comprises a pair comprising a permission policy and a condition policy that is associated with performing the operation on the computing resource, wherein the identifying is performed independently of an identification of the account. In some examples, operation 704 is implemented in a similar manner as operations 504-606 of FIG. 5.

After operation 704, process flow 700 moves to operation 706.

Operation 706 depicts identifying, by the system, that the attribute-based access control policy corresponds to a role policy that is associated with the account. In some examples, operation 706 is implemented in a similar manner as operation 508 of FIG. 5.

After operation 706, process flow 700 moves to operation 708.

Operation 708 depicts determining whether the account and the role policy satisfy the first attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource. In some examples, operation 708 is implemented in a similar manner as operation 510 of FIG. 5.

After operation 708, process flow 700 moves to operation 710.

Operation 710 depicts, in response to determining that the account satisfies the permission policy and the condition policy, performing the operation on the computing resource. In some examples, operation 710 is implemented in a similar manner as operation 512 of FIG. 5.

After operation 710, process flow 700 moves to 712, where process flow 700 ends.

FIG. 8 illustrates an example process flow 800 that can facilitate attribute based access control using scoped rules and conditioned permissions dynamic policies, in accordance with an embodiment of this disclosure. In some examples, one or more embodiments of process flow 800 can be implemented by attribute based access control using scoped rules and conditioned permissions dynamic policies component 108 of FIG. 1, or computing environment 900 of FIG. 9.

It can be appreciated that the operating procedures of process flow 800 are example operating procedures, and that there can be embodiments that implement more or fewer operating procedures than are depicted, or that implement the depicted operating procedures in a different order than as depicted. In some examples, and/or process flow 800 can be implemented in conjunction with one or more embodiments of one or more of process flow 500 of FIG. 5, process flow 600 of FIG. 6, process flow 700 of FIG. 7, and/or process flow 800 of FIG. 8.

Process flow 800 begins with 802, and moves to operation 804.

Operation 804 depicts, identifying an attribute-based access control policy that comprises a pair comprising a permission policy and a condition policy that is associated with performing an operation on a computing resource, wherein the identifying is performed independently of an identification of an account. In some examples, operation 804 is implemented in a similar manner as operations 504-606 of FIG. 5.

After operation 804, process flow 800 moves to operation 806.

Operation 806 depicts identifying that the attribute-based access control policy corresponds to a role policy that is associated with the account. In some examples, operation 806 is implemented in a similar manner as operation 508 of FIG. 5.

After operation 806, process flow 800 moves to operation 808.

Operation 808 depicts determining whether the account and the role policy satisfy the first attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource. In some examples, operation 808 is implemented in a similar manner as operation 510 of FIG. 5.

After operation 808, process flow 800 moves to operation 810.

Operation 810 depicts in response to determining that the account satisfies the permission policy and the condition policy, performing the operation on the computing resource. In some examples, operation 810 is implemented in a similar manner as operation 512 of FIG. 5.

After operation 810, process flow 800 moves to 812, where process flow 800 ends.

Example Operating Environment

In order to provide additional context for various embodiments described herein, FIG. 9 and the following discussion are intended to provide a brief, general description of a suitable computing environment 900 in which the various embodiments of the embodiment described herein can be implemented.

For example, parts of computing environment 900 can be used to implement one or more embodiments of server 102 and/or remote computer 106 of FIG. 1.

In some examples, computing environment 900 can implement one or more embodiments of the process flows of FIGS. 5-8 to facilitate attribute-based access control using scoped rules and conditioned permissions dynamic policies.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a nonvolatile storage such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips ...), optical discs (e.g., CD, DVD ...), smart cards, and flash memory devices (e.g., card, stick, key drive ...). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory coupled to the processor, comprising instructions that, in response to execution by the processor, cause the system to perform operations, comprising:
   receiving a request associated with an account to perform an operation on a computing resource;
   identifying an attribute-based access control policy that comprises a pair comprising a permission policy and a condition policy that is associated with performing the operation on the computing resource, wherein the identifying is performed independently of an identification of the account, wherein the permission policy comprises a first Boolean expression of one or more permissions, and wherein the condition policy comprises a second Boolean expression of one or more conditions;
   identifying that the attribute-based access control policy corresponds to a role policy that is associated with the account that is associated with performing the operation on the computing resource, wherein the role policy identifies a group of roles, wherein a role of the group of roles comprises a group of permissions, and wherein the group of roles is scoped to a group of resource groups;
   determining whether the account and the role policy satisfy the attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource; and
   in response to determining that the account satisfies the permission policy and the condition policy, performing the operation on the computing resource.

2. The system of claim 1, wherein the pair is a first pair, wherein the first attribute-based access control policy comprises a second pair, and wherein the operations further comprise:
   determining whether the account satisfies a permission policy and a condition policy of the second pair with respect to the operation, wherein performing the operation on the computing resource is performed in response to determining that the account satisfies the second pair.

3. The system of claim 1, wherein the computing resource is a member of a resource group, and wherein the account satisfies the permission with respect to the resource group.

4. The system of claim 1, wherein a label associated with the computing resource indicates that the computing resource is a member of the resource group.

5. The system of claim 1, wherein the permission policy is specified according to a declarative resource modeling language.

6. The system of claim 1, wherein the condition policy is specified according to a declarative resource modeling language.

7. The system of claim 1, wherein the permission policy is stored in a form that omits computer-executable code.

8. A method, comprising:
   in response to receiving a request associated with an account to perform an operation on a computing resource, identifying, by a system comprising a processor, an attribute-based access control policy that comprises a pair comprising a permission policy and a condition policy that is associated with performing the operation on the computing resource, wherein the identifying is performed independently of an identification of the account;

identifying, by the system, that the attribute-based access control policy corresponds to a role policy that is associated with the account;

determining, by the system, whether the account and the role policy satisfy the first attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource; and in response to determining that the account satisfies the permission policy and the condition policy, performing, by the system, the operation on the computing resource.

9. The method of claim 8, wherein the permission policy comprises a first Boolean expression of one or more permissions, and wherein the condition policy comprises a second Boolean expression of one or more conditions.

10. The method of claim 8, wherein the role policy identifies a group of roles, wherein a role of the group of roles comprises a group of permissions, and wherein the group of roles is scoped to a group of resource groups.

11. The method of claim 8, wherein the permission is specified according to a declarative resource modeling language.

12. The method of claim 8, wherein the condition is specified according to a declarative resource modeling language.

13. The method of claim 8, wherein the pair is a first pair, wherein the first attribute-based access control policy comprises a second pair, and further comprising:

determining, by the system, whether the account satisfies a permission policy and a condition policy of the second pair with respect to the operation, wherein performing the operation on the computing resource is performed in response to determining that the account satisfies the second pair.

14. The method of claim 8, wherein the computing resource is a member of a resource group, and wherein the account satisfies the permission with respect to the resource group.

15. The method of claim 8, wherein a label associated with the computing resource indicates that the computing resource is a member of the resource group.

16. The method of claim 8, wherein the permission policy is specified according to a declarative resource modeling language.

17. A non-transitory computer-readable medium comprising instructions that, in response to execution, cause a system comprising a processor to perform operations, comprising:

identifying an attribute-based access control policy that comprises a pair comprising a permission policy and a condition policy that is associated with performing an operation on a computing resource, wherein the identifying is performed independently of an identification of an account;

identifying that the attribute-based access control policy corresponds to a role policy that is associated with the account;

determining whether the account and the role policy satisfy the first attribute-based access control policy with respect to the operation, wherein the determining comprises evaluating whether the computing resource and a required permission of the permission policy is declared in the role policy, and evaluating whether the account and the role policy satisfy the condition policy evaluates to true based on attributes of the account and attributes of the computing resource; and in response to determining that the account satisfies the permission policy and the condition policy, performing the operation on the computing resource.

18. The non-transitory computer-readable medium of claim 17, wherein the pair is a first pair, wherein the first attribute-based access control policy comprises a second pair, and wherein the operations further comprise:

determining whether the account satisfies a permission policy and a condition policy of the second pair with respect to the operation, wherein performing the operation on the computing resource is performed in response to determining that the account satisfies the second pair.

19. The non-transitory computer-readable medium of claim 17, wherein the computing resource is a member of a resource group, and wherein the account satisfies the permission with respect to the resource group.

20. The non-transitory computer-readable medium of claim 17, wherein a label associated with the computing resource indicates that the computing resource is a member of the resource group.

* * * * *